April 7, 1931. A. F. ZIEGLER 1,799,667

COMPRESSION FAUCET VALVE

Filed Nov. 14, 1928

Inventor:
Adolph F. Ziegler
Attorney.

Patented Apr. 7, 1931

1,799,667

UNITED STATES PATENT OFFICE

ADOLPH F. ZIEGLER, OF CLEVELAND, OHIO

COMPRESSION-FAUCET VALVE

Application filed November 14, 1928. Serial No. 319,339.

My invention relates to improvements in compression faucet valve, and has for its object the provision of a self-centering valve member that will long function efficiently.

A valve member of the ball type long has been recognized as desirable in the industry, and numerous types have been designed and used. However, in practice, I have discovered that if the spherical or ball member is permitted to turn axially with respect to its seat, then the non-conforming wear of the engaging surfaces, sooner or later, will cause continued leakage. This results from the fact that different spherical surfaces of the valve member are presented to the coacting seat.

Furthermore, the ordinary faucet commonly requires replacement of the deteriorating valve surface at frequent intervals, hence I have provided a simple procedure for applying my improved self-centering valve member to an old faucet and forming a coacting seat having a suitable spherical contoured surface.

Figure 1:
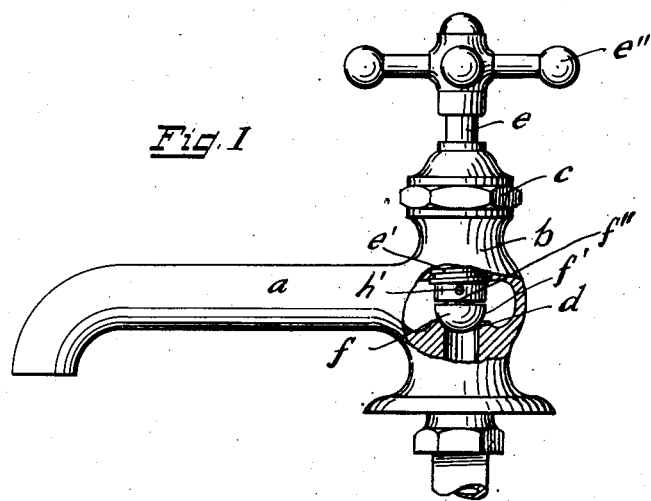
Figure 2:
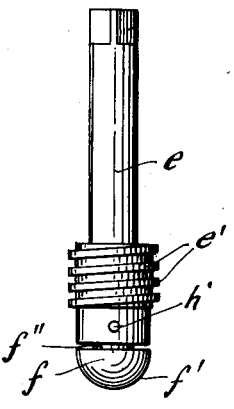
Figure 3:
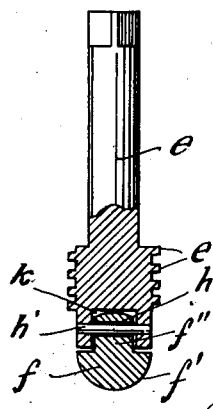
Figure 5:
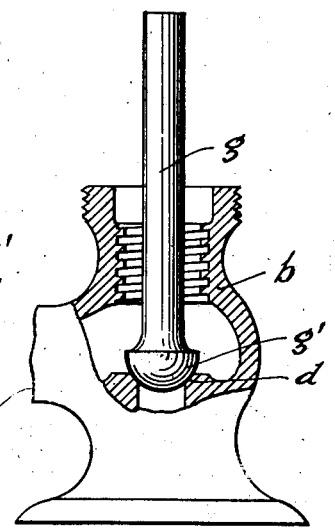
Figure 4:
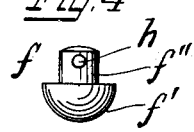

The details of my improvements may best be explained by making reference to the accompanying drawings, wherein:

Figure 1 is a view in elevation of a compression faucet embodying my improved construction, the body of which is partly broken away and in section, Fig. 2 is a view of the valve stem and valve member in elevation, Fig. 3 is a similar view, partly in section, Fig. 4 is a detached view of my improved valve member, and Fig. 5 is an enlarged view, partially broken away and in section, illustrating the practice of my method for forming the valve seat.

Throughout the several figures of the drawings, I have employed the same character of reference to indicate similar parts.

Describing first the faucet embodying my invention in a typical manner, which may be assumed either to be new construction or a renewed device, the body $b$ thereof, merging into the spout $a$, and mounting the usual packing or gland structure $c$, is sectioned to show a characteristic valve seat $d$. The valve stem $e$ is threaded at $e'$ and is provided with a suitable handle $e''$ by which the compression faucet is operated.

Axially positioned above the seat $d$ of spherical contour, is the coacting valve member $f$, Fig. 4. This metallic member has a substantially semi-spherical face $f'$ for engaging the seat $d$, and a stem having a rounded upper terminal $f''$; said stem being transversely bored at $h$ to accommodate the pin of materially smaller diameter $h'$ which is inserted transversely of the lower end of the valve stem, Fig. 3. Said valve stem $e$ is terminally recessed at $k$ to accommodate the entering stem of the valve member loosely therein.

This mounting for the valve member provides a support that will bring it into engagement with the valve seat, each time in the same axial and horizontal planes, while affording a substantial axial self-adjustment for accommodating or compensating minor structural variance of the parts. By this means the valve member is prevented from independent rotation and/or displacement by the flow of water or movement of the parts. Consequently, the members accurately conform initially as well as when they become worn, by reason of the preservation of their axial relation by means of the novel mounting.

Thus, the valve member hangs loosely from its supporting pin until the valve seat is engaged, as in Fig. 1, whereupon it accommodates itself to the conforming seat, and its terminal $f''$ is acted upon by the upper face of recess $k$ forcibly to close the inlet opening by the action of the screw $e'$.

The valve seat is cheaply and readily formed by employing the steel tool $g$, having a semi-spherical terminal $g'$ of the same diameter as $f'$. By inserting the tool, either in a faucet casting, or in an old faucet, as indicated in Fig. 5, a valve seat of spherical contour $d$ is formed by the easy and inexpensive method of lightly tapping the tool, as indicated.

Moreover, an old valve stem likewise may be equipped with my improvement merely by boring a suitable recess $k$ therein, and inserting one of the mushroom shaped valve parts or members, such as shown in Fig. 4, by means of a small transverse pin. This mode of adapting or renewing an old faucet of ordinary type immediately affords all the advantages of my self-centering valve structure above referred to. Obviously the particular type of faucet shown has no limiting effect in connection with my instant improvements disclosed and hereinafter claimed.

The metallic unswiveled valve part, however, is essential to my invention, affording a sufficient axial adjustment to engage its co-acting seat by bodily shifting the axis thereof without turning independently of the valve stem, and thus efficiently and tightly close the valve opening during long continued use.

Having now described one type of faucet construction embodying and exemplifying my invention, and the preferred mode of installing the valve-structure thereof, I claim as new and desire to secure by Letters Patent, the following:

In faucet construction of the compression type, a body having a valve seat of spherical contour, a rotatable threaded valve stem axially positioned with respect to the valve seat, there being a terminal recess having an upper face in the valve stem adjacent said valve seat, a mushroom shaped metallic valve member having a semi-spherical valve face and a transversely bored stem terminating in an upper rounded face disposed in said recess, and means cooperating with the transverse bore, in the stem for loosely mounting said bored stem in said recess in unswivelled and axially movable relation to the valve stem, said upper rounded face bearing against said recess upper face for seating said semi-spherical face in said spherical contour seat when the valve stem is rotated.

In testimony whereof I do now affix my signature.

ADOLPH F. ZIEGLER.